June 27, 1939. N. E. LAWRENCE 2,163,981
REAR WHEEL SUSPENSION FOR MOTOR VEHICLES
Filed Dec. 6, 1938 4 Sheets-Sheet 4

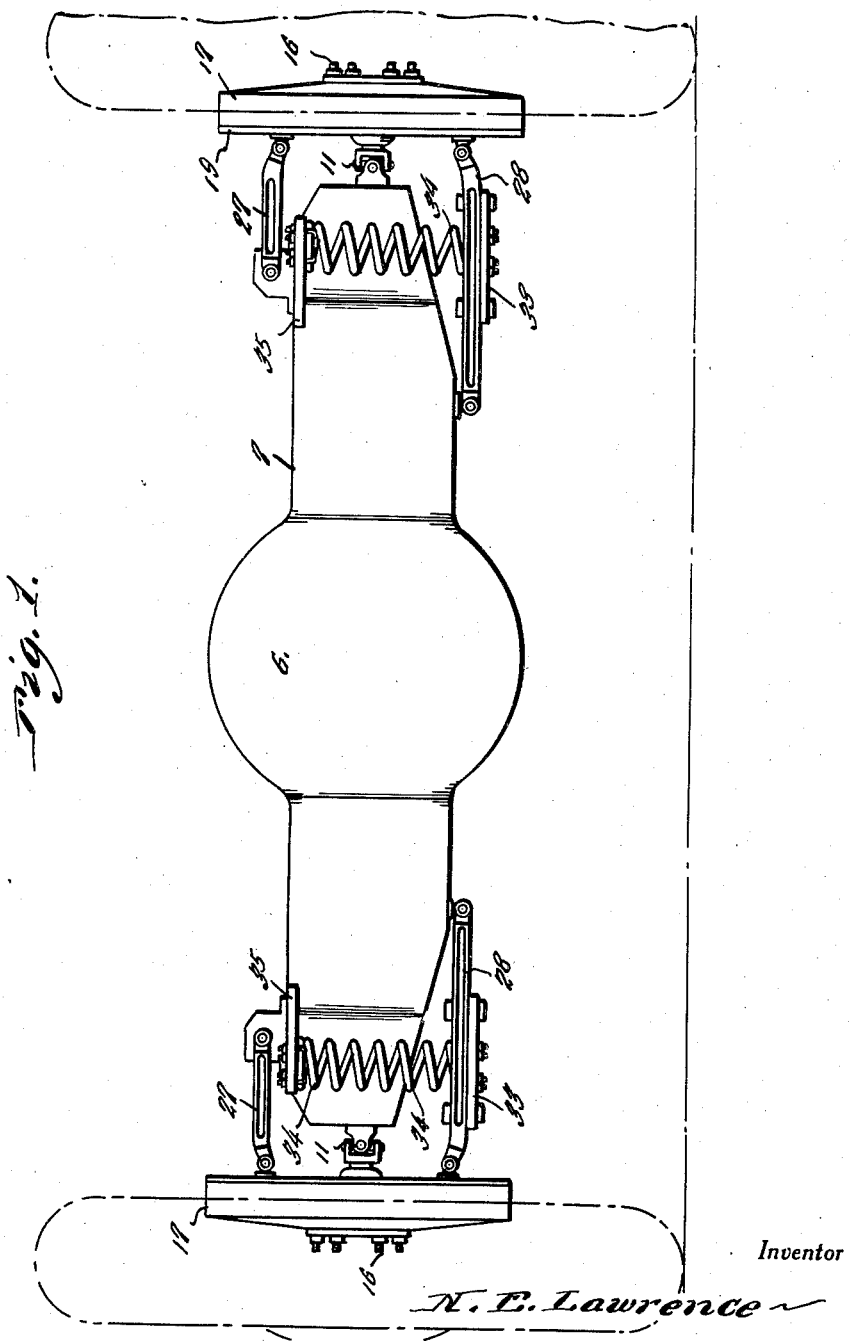

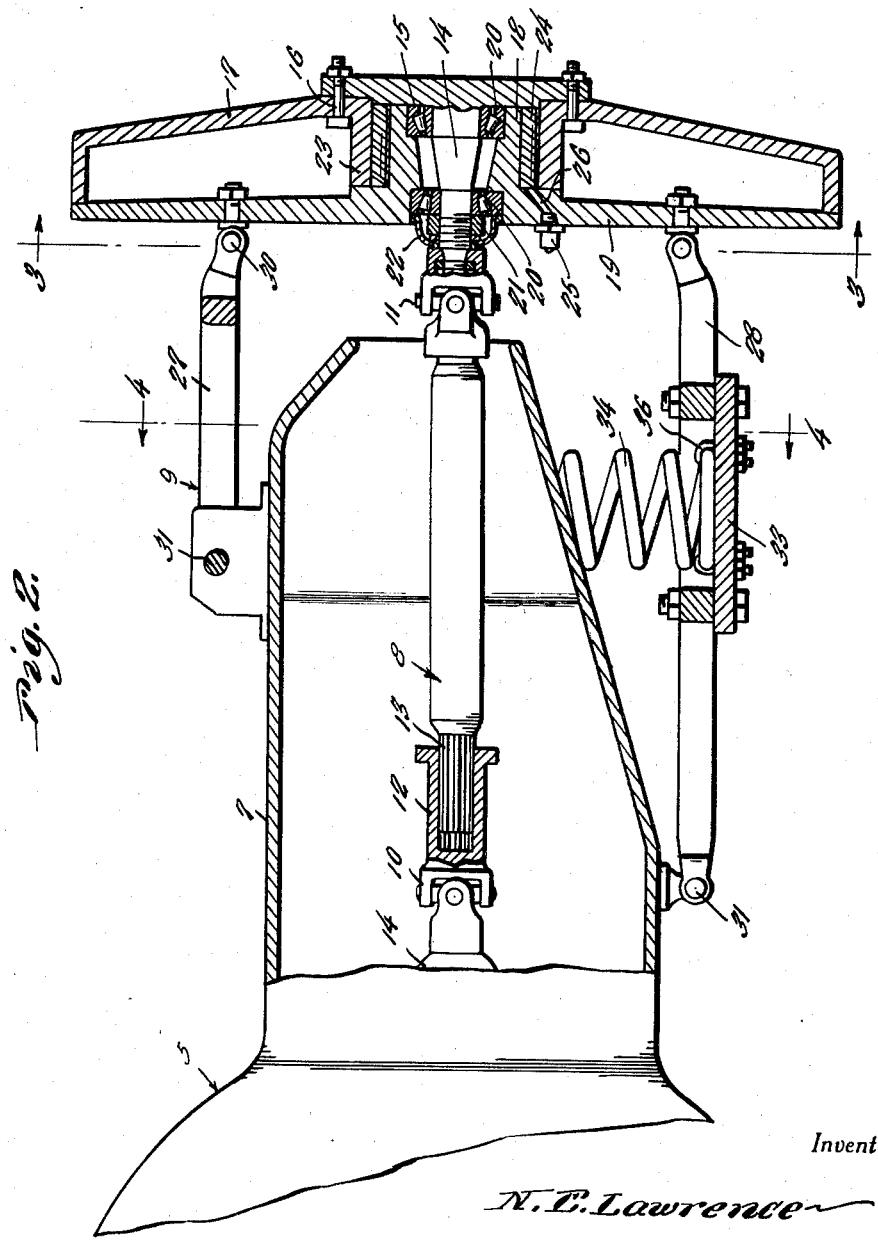

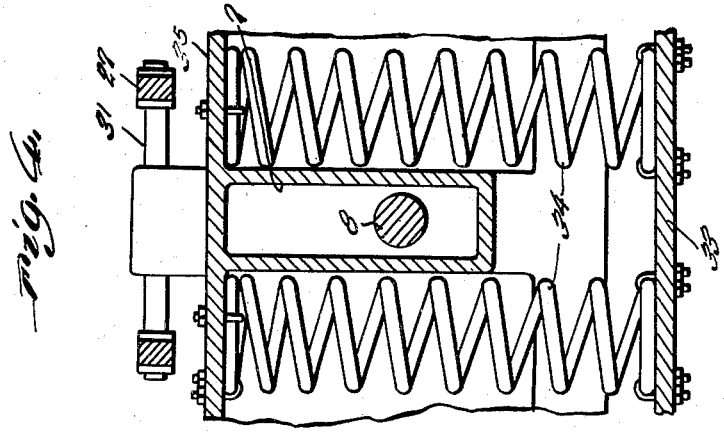
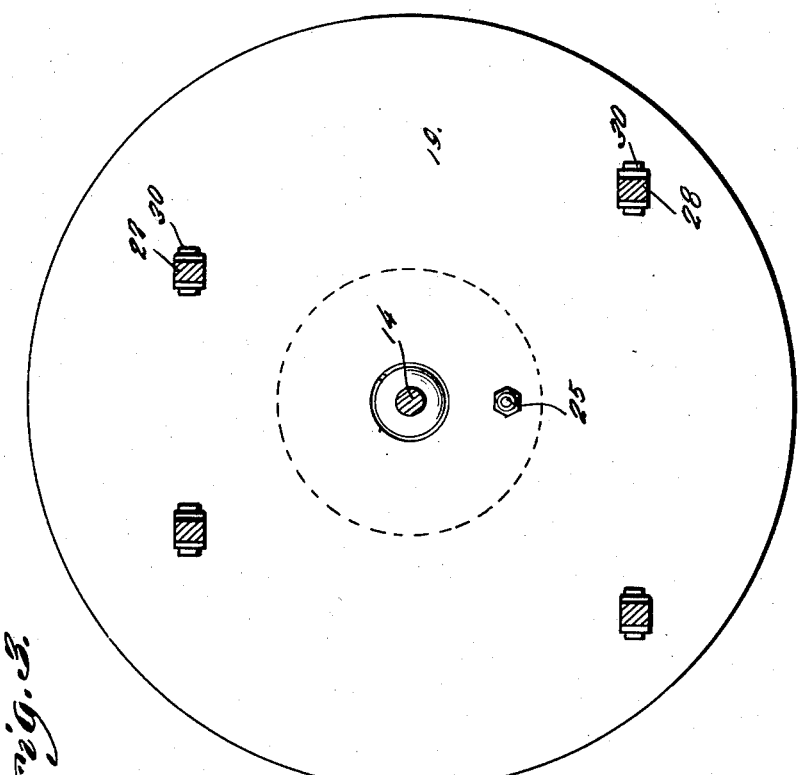

Inventor
N. E. Lawrence
By Clarence A. O'Brien
and Hyman Berman
Attorneys

Patented June 27, 1939

2,163,981

UNITED STATES PATENT OFFICE 2,163,981

REAR WHEEL SUSPENSION FOR MOTOR VEHICLES

Norman E. Lawrence, Fremont, Ohio

Application December 6, 1938, Serial No. 244,256

7 Claims. (Cl. 180—73)

This invention relates to rear wheel suspension for motor vehicles, and has for the primary object the provision of a device of this character which will permit independent vertical movement of each rear axle and wheel thereof when passing over uneven ground to improve the riding quality of the rear of the motor vehicle and render the riding quality thereof substantially equal to the riding quality of the front end of the vehicle which is equipped with knee action or equivalent construction.

Another object of this invention is the provision of a device of the above stated character which will eliminate the necessity of universal joints between the transmission and differential within the propeller shaft and which will permit the connecting of the differential and transmission housing rigidly on the frame of the motor vehicle and thereby permit a lower center of gravity to the vehicle to be obtained with the conventional propeller shaft well eliminated in the floor of the vehicle body.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a rear elevation illustrating a rear axle assembly of a motor vehicle constructed in accordance with my invention and showing the rear wheels diagrammatically.

Figure 2 is a fragmentary vertical sectional view illustrating the same.

Figure 3 is a transverse sectional view taken on the line 3—3 of Figure 2.

Figure 4 is a transverse sectional view taken on the line 4—4 of Figure 2.

Figure 5:
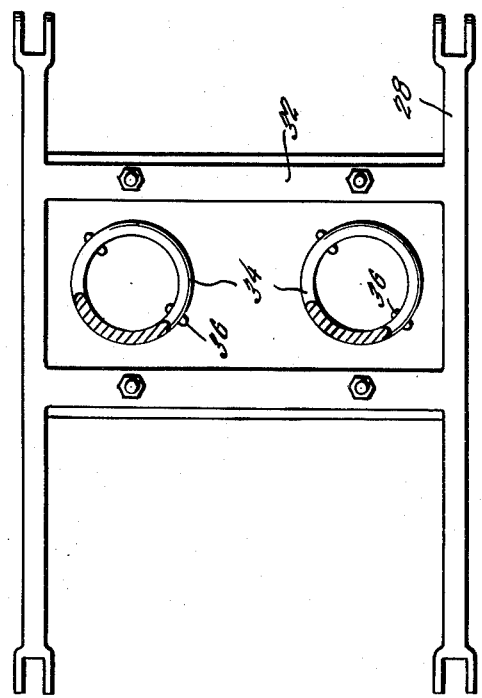
Figure 5 is a plan view, partly in section, illustrating one of the spring carrying frames acting as a connecting medium between the rear wheel brake drum dust plate and the differential housing.

Referring in detail to the drawings, the numeral 5 indicates the rear axle housing for a motor vehicle in which a portion thereof is enlarged, as shown at 6, to receive the conventional type of differential (not shown) and the oppositely extending sleeve-like portions 7 to receive the live axles 8. By the use of the present invention the rear axle housing 5 may have the motor vehicle frame (not shown) rigidly fastened thereon so as to eliminate the necessity of employing universal joints in the propeller shaft (not shown) of the vehicle and which connects the conventional transmission to the differential. It is also to be understood that the transmission housing (not shown) may be rigidly fastened on the motor vehicle frame, consequently permitting the center of gravity of the motor vehicle frame to be lowered and eliminates relative movement between the transmission and differential as well as between the differential, transmission and the motor vehicle frame. This also obviates the necessity of employing a propeller shaft well in the floor of the motor vehicle body.

The combined wheel and spring suspensions are indicated in entirety by the character 9 and as both are identical in construction, reference to one specifically is thought sufficient for both and this also applies to the live axles 8 which are capable of moving vertically within the sleeve-like portions 7 of the rear axle housing 5 as well as having a limited forward and backward motion.

Each live axle 8 includes universal joints 10 and 11, the universal joint 10 being connected directly to the differential and including a sleeve-like portion 12 having grooves to receive splined ribs 13 formed on the live axle. This permits the live axle to have a limited endwise movement with respect to the universal joint 10 and the differential. A suitable packing means 14 is provided between the rear axle housing and the live axle adjacent its connection with the differential to prevent loss of lubricant from within the differential housing.

The universal joint 11 is located partly outwardly of the sleeve-like portion 7 of the rear axle housing 5 and has threaded or otherwise detachably secured thereto an axle spindle 14 including an integral flange 15 to which is detachably secured by bolts 16 a brake drum 17. Also bolts 16 may be employed for securing the rear wheel to the flange 15 or the rear wheel may form an integral part of the axle spindle flange 15. The axle spindle 14 is journaled in a hub-like sleeve 18 forming an integral part of a dust shield plate 19 that coacts with the brake drum 17. The axle spindle is retained in and supported within the hub-like sleeve 18 by bearings 20 and a retaining nut 21 threaded on the axle spindle and against one of the bearings 20. Thus it will be seen that the axle spindle is free to rotate within the hub-like portion of the dust shield plate 19 and a removable dust cap 22 coacts with the latter-named bearing in retaining lubricant within the bearings and on the axle spindle and prevents the entrance of dirt and other foreign matter to the bearings. The dust cap 22 also covers the nut 21, it being understood that the dust cap is removable so that adjustment of the nut 21 may be readily made to take up play or to permit removal of the axle spindle 14 from the hub portion 18 of the plate 19 as well as detaching the axle spindle from the universal joint 11.

The brake drum 17 includes a hub-like portion 23 supported on the hub-like portion 18 of the dust shield plate 19 by bearings 24, the latter acting to carry the load of the vehicle and are furnished with lubricant by way of a lubricant fitting 25 and a lubricant passage 26.

The wheel suspension device 9 further includes upper and lower frames 27 and 28 which are pivotally connected to the dust shield plate 19 above and below the axle spindle and live axle 8, as shown at 30, and further pivoted on the sleeve-like portion 7 of the rear axle housing 5, as shown at 31.

Figure 7:
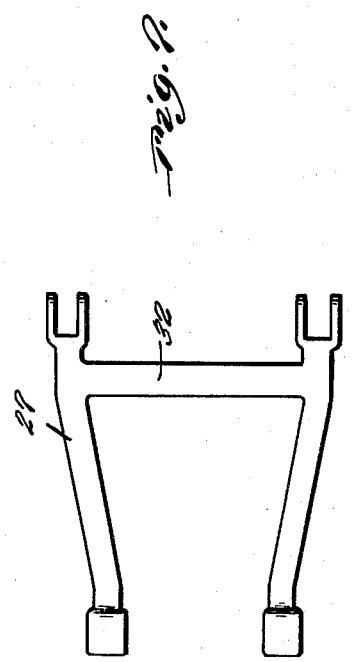
Figure 7 is a plan view illustrating one of the upper frames employed for connecting the differential housing to the dust shield plate of the brake drum of the rear wheel.
Figure 6:
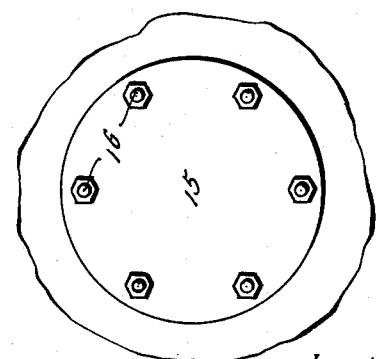
Figure 6 is a fragmentary front elevation illustrating bolts and nuts for securing the rear wheel on the brake drum.

The frames 27 and 28 each includes parallel arms connected together by cross members 32, the parallel arms having bifurcated portions apertured to receive the pivots 30, and 31, as clearly shown in Figures 5 and 7.

The cross members 32 of the lower frame 28 have bolted thereto a bed plate 33 on which are anchored the lower ends of coil springs 34 arranged vertically at opposite sides of the sleeve-like portions 7 of the rear axle housing 5 and have their upper ends anchored to plate-like portions 35 formed integrally with the sleeve-like portions 7 of the rear axle housing 5. U-bolts 36 are employed for anchoring the ends of the coil springs which will permit the coil springs to be readily removed when desired. The purpose of the coil springs is to yieldably support the load of the vehicle between the rear axle housing 5 and the lower frames 28 or the rear wheels connected with the axle spindles 14. Also the springs 34 act as cushions and are adapted to absorb road shocks from the wheels to the rear axle housing 5 and the vehicle frame carried directly thereby.

Thus it will be seen that the rear wheels carried by the axle spindles 14 are free to have vertical movement independently of each other, consequently providing in the rear axle construction or assembly of the motor vehicle what is commonly known as knee action, thereby providing riding quality to the rear of a motor vehicle which will be substantially equal to the riding quality obtained in present-day motor vehicle construction employing knee action in the front axle construction.

It is believed that the foregoing description, when taken in connection with the drawings, will fully set forth the construction and advantages of my invention to those skilled in the art to which a device relates, so that further detailed description will not be required.

Having thus described my invention, what I claim is:

1. A motor vehicle rear axle construction including a differential housing for the differential and adapted to be rigidly connected to a motor vehicle frame, live axles extending into said differential housing and having free vertical movement relative thereto, means for connecting said axles to the differential, axle spindles connected to said live axles and arranged exteriorly of the housing, brake drums providing mountings for rear wheels secured on the axle spindles for rotation therewith, means journaled on the spindles and providing journals for the drums, and cushion means connecting said second means on the housing for vertical movement relative thereto.

2. A motor vehicle rear axle construction including a differential housing for a differential and adapted to be rigidly connected to a motor vehicle frame, live axles extending into said differential housing and having free vertical movement relative to said housing, universal joints for connecting said axles to the differential and permitting the axles to have endwise movement, universal joints connected to said live axles and extending outwardly of the housing, axle spindles detachably connected to said second-named universal joints, brake drums providing mountings for rear wheels secured on the axle spindles for rotation therewith, means journaled on the spindles and providing journals for the drums, and cushion means connecting said first means on the housing for vertical movement relative thereto.

3. A motor vehicle rear axle construction including a differential housing for a differential and adapted to be rigidly connected to a motor vehicle frame, live axles extending into said differential housing and having free vertical movement relative to said housing, universal joints connecting the axles to the differential and permitting the axles to have endwise movement relative to the differential, universal joints connected to said axles and extending outwardly of the housing, axle spindles detachably connected to the second-named universal joints, dust shield plates including hub portions journaled on the axle spindles, brake drums including hub portions journaled on the hub portions of the dust shield plates, means connecting the brake drums to the axle spindles, and cushion means connecting said dust shield plates to the differential housing for vertical movement relative thereto.

4. A motor vehicle rear axle construction including a differential housing for a differential and adapted to be rigidly connected to a motor vehicle frame, live axles extending into said differential housing and having free vertical movement relative thereto, universal joints connecting the live axles to the differential and permitting said axles to have endwise movement, universal joints connected to the live axles and extending outwardly of the differential housing, axle spindles detachably connected to the second-named universal joints, dust shield plates including hubs journaled on the axle spindles, antifriction bearings between the hub portions of the dust shield plates and the axle spindles, brake drums including hub portions journaled on the hub portions of the dust shield plates, anti-friction bearings between the hub portions of the drums and the dust shield plates, means for connecting the drums onto the axle spindles, and cushion means connecting said dust shield plates on the differential housing for vertical movement relative thereto.

5. A motor vehicle rear axle construction including a differential housing for a differential and adapted to be rigidly connected to a motor vehicle frame, live axles extending into said differential housing and having free vertical movement relative thereto, universal joints connecting the live axles to the differential and permitting said axles to have endwise movement, universal joints connected to the live axles and extending outwardly of the differential housing, axle spindles detachably connected to the second-named universal joints, dust shield plates including hubs journaled on the axle spindles, anti-friction bearings between the hub portions of the dust shield plates and the axle spindles, brake drums including hub portions journaled on the hub portions of the dust shield plates, anti-friction bearings between the hub portions of the drums and the dust shield plates, flanges integral with the axle spindles and detachably connected onto the brake drums, and cushion means connecting said dust shield plates onto the differential housing for vertical movement relative thereto.

6. A motor vehicle rear axle construction including a differential housing for a differential and adapted to be rigidly connected to a motor vehicle frame, live axles extending into said differential housing and having free vertical movement relative thereto, universal joints connecting the live axles to the differential and permitting said axles to have endwise movement, universal joints connected to the live axles and extending outwardly of the differential housing, axle spindles detachably connected to the second-named universal joints, dust shield plates including hubs journaled on the axle spindles, anti-friction bearings between the hub portions of the dust shield plates and the axle spindles, brake drums including hub portions journaled on the hub portions of the dust shield plates, anti-friction bearings between the hub portions of the drums and the dust shield plates, flanges integral with the axle spindles and detachably connected onto the brake drums, upper and lower frames pivotally connected on the differential housing and on the dust shield plates above and below the axles, and cushion means between the differential housing and the lower frames.

7. A motor vehicle rear axle construction including a differential housing for a differential and adapted to be rigidly connected to a motor vehicle frame, live axles extending into said differential housing and having free vertical movement relative thereto, universal joints connecting the live axles to the differential and permitting said axles to have endwise movement, universal joints connected to the live axles and extending outwardly of the differential housing, axle spindles detachably connected to the second-named universal joints, dust shield plates including hubs journaled on the axle spindles, anti-friction bearings between the hub portions of the dust shield plates and the axle spindles, brake drums including hub portions journaled on the hub portions of the dust shield plates, anti-friction bearings between the hub portions of the drums and the dust shield plates, flanges integral with the axle spindles and detachably connected onto the brake drums, upper and lower frames pivotally connected on the differential housing and on the dust shield plates above and below the axles, and coil springs mounted on the lower frames and on the differential housing for cushioningly supporting the latter.

NORMAN E. LAWRENCE.